(12) United States Patent
Roberts et al.

(10) Patent No.: US 7,454,761 B1
(45) Date of Patent: Nov. 18, 2008

(54) METHOD AND APPARATUS FOR CORRELATING OUTPUT OF DISTRIBUTED PROCESSES

(75) Inventors: Kenneth J. Roberts, San Jose, CA (US); Petre Dini, San Jose, CA (US); Masum Z. Hasan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 529 days.

(21) Appl. No.: 10/327,225

(22) Filed: Dec. 20, 2002

(51) Int. Cl.
*G06F 9/44* (2006.01)
*G06F 11/00* (2006.01)

(52) U.S. Cl. .................... 719/318; 714/25; 714/26; 714/46

(58) Field of Classification Search ............ 714/25–27, 714/31, 42–49, 57; 718/106; 719/320, 318; 717/127–128
See application file for complete search history.

(56) References Cited

U.S. PATENT DOCUMENTS

| | | | |
|---|---|---|---|
| 5,408,218 A | 4/1995 | Svederg | |
| 5,768,501 A | 6/1998 | Lewis | |
| 5,922,051 A | 7/1999 | Sidey | |
| 6,052,722 A | 4/2000 | Taghadoss | |
| 6,154,129 A | 11/2000 | Kajitani et al. | |
| 6,243,746 B1 | 6/2001 | Sondur et al. | |
| 6,271,845 B1 | 8/2001 | Richardson | |
| 6,349,333 B1 | 2/2002 | Panikatt et al. | |
| 6,356,885 B2 | 3/2002 | Ross et al. | |
| 6,456,306 B1 | 9/2002 | Chin et al. | |
| 6,721,941 B1 * | 4/2004 | Morshed et al. ............. 717/127 |
| 7,039,921 B2 * | 5/2006 | Shah et al. ................. 719/318 |
| 2003/0005021 A1 * | 1/2003 | Shah et al. ...................... 709/1 |
| 2003/0061550 A1 * | 3/2003 | Ng et al. ......................... 714/45 |
| 2003/0195959 A1 * | 10/2003 | Labadie et al. .............. 709/224 |

OTHER PUBLICATIONS

Jakobson et al., "Alarm Correlation—Correlating multiple network alarms improves", IEEE network, Nov. 1993.

* cited by examiner

*Primary Examiner*—Meng-Ai An
*Assistant Examiner*—Charles E Anya
(74) *Attorney, Agent, or Firm*—Hickman Palermo Truong & Becker LLP

(57) ABSTRACT

A method for correlating output of distributed processes includes receiving certain information at a first process of multiple distributed processes that perform one computer application. The information includes a unique identifier for a particular instance of the application that is different from any other identifier for any other instance of the application. The unique identifier is included in data written by the first process to a first data structure. Based on the unique identifier, the data in the first data structure is correlated with data in a different, second data structure written by a different, second process.

21 Claims, 5 Drawing Sheets

METHOD AND APPARATUS FOR CORRELATING OUTPUT OF DISTRIBUTED PROCESSES

FIELD OF THE INVENTION

The present invention generally relates to distributed processing of computer applications. The invention relates more specifically to correlating output of distributed processes related to a particular application.

BACKGROUND OF THE INVENTION

The approaches described in this section could be pursued, but are not necessarily approaches that have been previously conceived or pursued. Therefore, unless otherwise indicated herein, the approaches described in this section are not admitted to be prior art to the claims in this application merely by inclusion in this section.

Computer programs are sets of instructions for controlling processors in computing devices. Computer programs typically are written in one or more high level languages that are human readable. These source language statements then typically are compiled by a compiler program and converted to coded instructions, which often correspond to the actual operations performed by a processor in a computer device.

Frequently the coded instructions are not identical to the native instructions for the processor, but, instead, are instructions for a particular virtual machine. A virtual machine is a process that interprets coded instructions and executes them. The virtual machine itself is an executable sequence of instructions in the native language of the processor. Virtual machines sometimes act as source language interpreters. As used herein, the term "machines" includes virtual machines interpreting virtual machine instructions, operating systems interpreting operating system instructions, and processors executing native instructions.

In general, coded instructions from one or more modules can be linked to form an executable program. Modules can consist of source language statements, coded instructions for a particular virtual machine, runtime executables, or some combination of these, with or without associated data. Modules in a high-level source language may be compiled by a run time compiler to produce corresponding modules in coded instructions.

It is becoming more common to create programs that include heterogeneous modules. For example, a program may include a machine-executable module, a module executable by a first type of virtual machine, and a module executable by a second type of virtual machine. During execution of the program, a routine in the machine-executable module may call a routine in the module running in a first type of virtual machine, and that routine may call another routine in the module running in a second type of virtual machine.

In addition, it is common for programs executing on different processors to interact with each other. For example, an application program, such as a network management program, runs as a first process on one processor on one device on a network. While running, the first process may make a request of a device management server program (the "server"), a second process executing separately on a second device on the network, to provide management information about the second device. In turn, the second process may launch a local configuration program as a third process executing separately on the second device or invoke a user authentication program executing on a separate third device. The local configuration program determines properties of the local device by either getting the current status of the local device or changing the status or both. In many situations, the interacting programs will be written by different programmers in different organizations for different types of virtual machines on the different processors. For example, one will be a Java program, while the other is a C language program. The operations described in this paragraph represent just one example context in which similar problems may be encountered.

Some host computers and operating systems divide a program into multiple threads that can be executed separately. Multiple threads may be swapped, in turn, between memory and each processor of a host computer. In host computers with several processors, several threads may be executed simultaneously, each one on a different one of the several processors.

As used herein a "process" refers to any program or any portion of a program that can run independently, including one or more threads, one or more modules, one or more clients, one or more servers, and combinations of one or more clients and servers and other program portions.

Each process that runs can log certain events in a log file written specifically for that process. Logged events might include, for example, reaching certain milestones in the processing of data, encountering particular user actions, invoking separate processes, receiving results from separate processes, invocations by separate processes, returning results to separate processes, and encountering an error or interruption in processing. The log files are often important in determining what an instance of a process spawned from a module actually does when a particular user under particular circumstances executes the instructions in the module. Sometimes what an instance of a process does contrasts with what the process was designed to do because of equipment failures, external problems, or because some circumstances were unanticipated by the programmers of the process. The log files help developers of each process determine the actual performance of instances of processes. Typically, the log files are specific to a process; the events are identified and event properties are represented in ways specifically designed by the developers of the process.

A problem arises when it becomes useful to correlate data across log files written by interacting processes spawned from separately developed modules, often executing on different processors or in different threads. For example, an error encountered by the third process causes an error event to be entered in the log file for the third process along with data about the error of concern to developers of the third module, the local configuration program or the authentication agent program. The error is identified in the third log file by some error code, X, determined by the developers of the third module. The third process may then enter other information into the log file.

As a result of the error, the third process sometimes returns control to the calling process, the second process, with some indication of error. The error indication returned by the third process to the second process causes an error event to be entered in the log file for the second process along with data about the error of concern to developers of the second module, the device management server. The error is identified in the second log file by some error code, Y, determined by the developers of the device management server and may be unrelated to X, the code that identifies the error in the third log file. The second process may then enter other information into the second log file.

As a result of the error, the second process sometimes returns control to the calling process, the first process, with some indication of error. The error indication returned by the second process to the first process causes an error event to be entered in the log file for the first process along with data about the error of concern to developers of the first module, the network management program. The error is identified in the first log file by some error code, Z, determined by the developers of the network management program and may be unrelated to the way the error is identified in the second log file.

A user of the first process will find it difficult to retrieve information about the error event stored in the log file for the third process. The error identification, X, used in the third log file is unknown to the user of the first process.

In one approach, each current process passes the error identification in the current process, determined by the developers of the module for the current process, to the calling process that called the current process. The current process stores the error code returned from a called process in the log file along with the error identification. For example, the second process stores the value X along with the value Y in the second log file and passes the value Y to the first process. Then, the first process stores the value Y along with the value Z in the first log file. A user of the first process can retrieve information about the error event stored in the third log file by tracking backwards through the second log file. For example, the user finds in the first log file that the error Z is associated with the error Y; then searches the second log file to find that the error Y is associated with the error X; then searches the third log file to find the error X and the information about the error X.

One problem with this approach is that a user must track the error through all the log files of the intervening processes. Another problem is that the error codes may not be unique. For example, the error code X might appear several times in the third log file, every time the third process encounters the same problem; or, the error code Y might appear several times in the second log file; or both error codes might appear several times in their respective log files. There might not be sufficient information to determine which error identification is associated with the event of interest to the user.

Another approach is to require each current process to identify an error in the current process by the error identification returned from a called process, to use the same error identification in the log file, and to pass the same error identification to the calling process. For example, the second process stores the value X in the second log file, and passes the value X to the first process. Then, the first process stores the value X in the first log file. A user of the first process can retrieve information about the error event stored in the third log file by going directly to the third log file. For example, the user finds in the first log file that the error identification is X, then searches the third log file to find the error X and the information about the error X. The user does not have to search the log files of all the intervening processes.

One problem that remains is that the error codes may not be unique. For example, the error code X might appear several times in the third log file, every time the third process encounters the same problem. There might not be sufficient information in the third log file to determine which error identification is associated with the event of interest.

Timestamps can be used to associate events in the different log files. However, use of timestamps does not definitively determine which instance of error code X in the third log file is associated with the event in the first log file. If the processes that write the log files are on different devices, the clocks on the different devices should be synchronized to define a time window in which events are considered correlated. This suffers from the disadvantages that synchronization involves management of clock drift among various processors, requires definition of a time window, consumes system resources, and consumes software development resources. Furthermore, it is often problematic to determine a duration for the time window and to determine whether events are correlated if one of the events falls on or near the boundary of the time window.

Another approach is to generate a unique context identification ("context ID") for the error or event encountered in the third process, to include this unique context ID in the log file, and to pass this unique context ID to the calling program. The calling program then also includes the unique context ID with any data written to its log file. In this way, data entered in all log files related to the same event include the same context ID.

One disadvantage of this approach is that the context ID does not appear in all log files related to an event unless and until the context ID is returned to all calling processes up to the top process in the hierarchy. Therefore there is inherently a delay in correlating data in one log file to data in another log file, until the context ID is propagated back up to the root calling process. Also, because of the nature of the error or the types of interactions, it might not be possible to pass the context ID back through all the calling processes. For example, a client process may send a request message to an independent server process that only sends a return message upon completion of a service. In that case, the context ID will not appear in all log files of processes that are affected by the event, no matter how long a user waits.

Based on the foregoing, there is a clear need for correlating data through multiple log files, each log file written specifically for one process among multiple processes employed for an instance of an application, that does not suffer the deficiencies described above. More generally, there is a clear need for correlating output associated with multiple processes employed for an instance of an application, that does not suffer the deficiencies described above. Output associated with a process include log files written by the process, other data (such as message, web pages and configuration files) output by the process, and entities, such as threads and other processes, generated from the process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
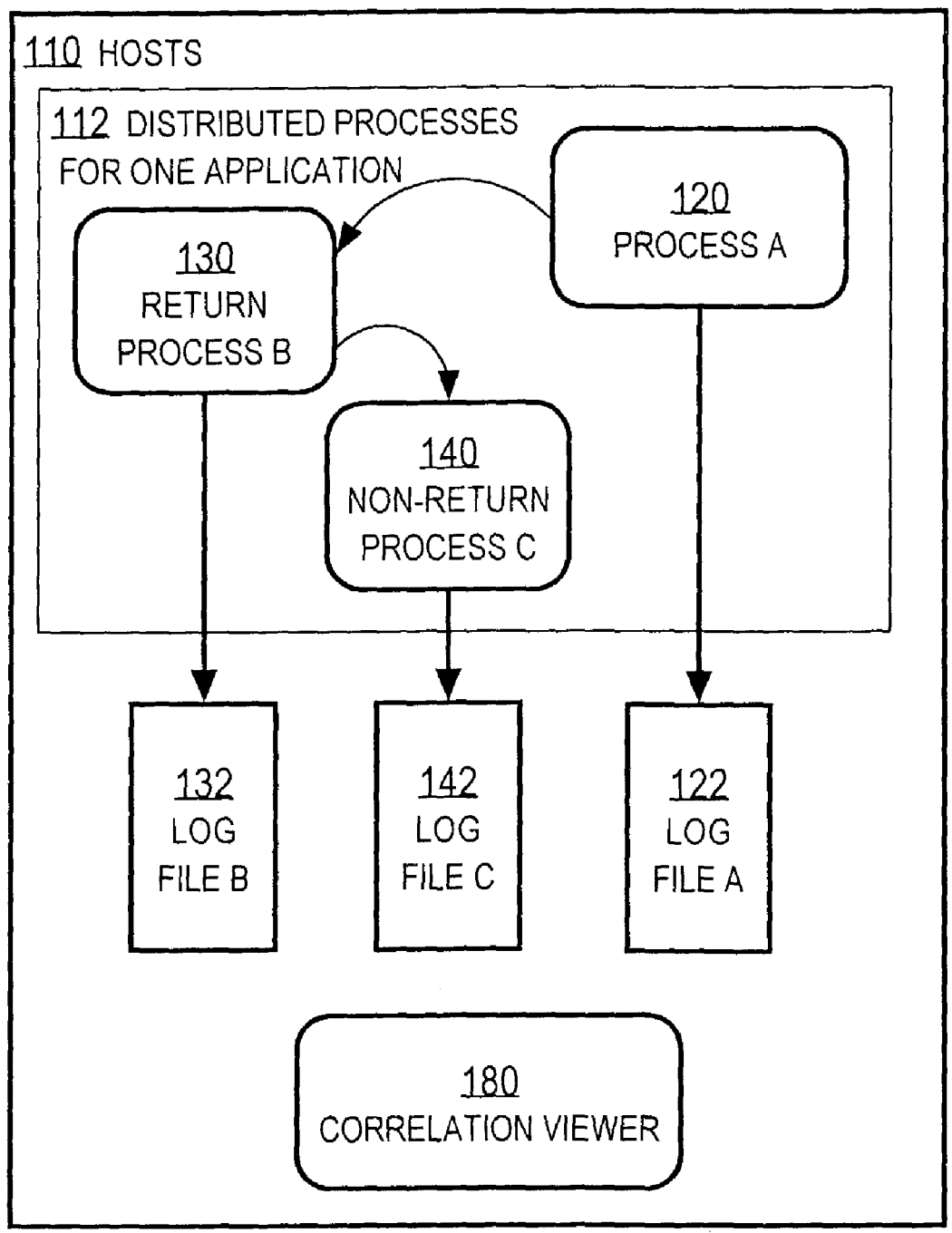
FIG. 1 is a block diagram that illustrates an overview of a system for correlating output of multiple distributed processes that implement a single application, according to an embodiment.

A method and apparatus are described for correlating output of distributed processes related to a computer application. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| | 2.1 Structural Overview |
| | 2.2 Functional Overview |
| 3.0 | Method of Correlating Data in Log files |
| | 3.1 Process of Writing Log files |
| | 3.2 Process of Viewing Data in Log files |
| 4.0 | Implementation Mechanisms—Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for correlating output of distributed processes related to a computer application. Certain information is received at a first process of multiple distributed processes that perform one computer application. The information includes a unique identifier for a particular instance of the application that is different from any other identifier for any other instance of the application. The unique identifier is included in data written by the first process to a first data structure. Based on the unique identifier, the data in the first data structure is correlated with data in a different, second data structure written by a different, second process.

In another aspect, a method of correlating output of distributed processes related to a computer application includes receiving first data at an output viewing process from output of a first process of multiple distributed processes that perform one computer application. The first data includes a first unique identifier for a first instance of the application. The first unique identifier is different from any other identifier for any other instance of the application. Second data is also received at the output viewing process from output of a second process of the distributed processes. The second data includes a second unique identifier for a second instance of the application. The second unique identifier is different from any other identifier for any other instance of the application. It is determined whether the first data is correlated with the second data based on whether the first unique identifier is the same as the second unique identifier.

In other aspects, the invention encompasses a computer apparatus, and a computer readable medium, including a carrier wave, configured to carry out the foregoing steps.

Embodiments are described in the following sections in the context of data written to event log files by separate processes, which processes are invoked directly or indirectly by a particular application. However, the invention is not limited to this context. Other embodiments include other output associated with multiple processes. For example, some embodiments include correlating data in multiple web pages written by different web servers that execute on one or more different host machines connected to a network. As another example, some embodiments include correlating configuration data for multiple network devices written by different device management servers that execute on one or more different network devices. Other embodiments include correlating operations, such as data packet forwarding operations, at multiple network devices configured by different device management servers that execute on one or more different network devices.

2.0 Structural and Functional Overview

To illustrate correlating data across multiple log files, it is assumed that an application program begins when a user launches Process A, which interacts with Process B, which interacts with Process C. Each of the processes writes a log file to record information about the progress of its processing. In other embodiments, each process may interact with more or fewer processes. In the illustrated embodiment, Process B returns control to the invoking Process A; therefore Process B is called a "return process." In the illustrated embodiment, Process C does not return control to invoking Process B, but proceeds independently; therefore Process C is called a "non-return process." For example, process C is a server process that does not send a response back to Process B.

2.1 Structural Overview

FIG. 1 is a block diagram that illustrates an overview of a system for correlating output of multiple distributed processes that implement a single application, according to an embodiment. Multiple distributed processes 112 execute on one or more hosts 110 connected by a network. Each host is a computing device of a computer system, such as a computer system described below in Section 4.0 with reference to FIG. 5. Executing on the one or more hosts 110 are instances of three processes 120, 130, 140, also termed Process A, Process B, Process C. Each instance of process 120, 130, 140 may execute on the same host or on a different host of the one or more program hosts 110.

Each process 120, 130, 140 writes a log file 122, 132, 142, respectively, to record its progress, as indicated by solid arrows with straight segments. The log files may include indications of various events, such as reaching certain milestones in the processing of data, encountering particular user actions, invoking separate processes, receiving results from separate processes, invocation by separate processes, returning results to separate processes, and encountering an error or interruption in processing. In some embodiments, each instance of each process writes to a different log file. In some embodiments, several instances of the same process write to the same log file. For example, two instances of process 140 write to the same log file 142. In other embodiments, one or more of the processes 120, 130, 140 does not write a log file. For example, in another embodiment, process 130 does not write log file 132.

The curved arrows indicate that an instance of process 120 (Process A), the main process of the application program, invokes an instance of process 130 (Process B) which invokes an instance of process 140 (Process C).

Executing on the one or more hosts 110 is a correlation viewer process ("correlation viewer") 180, according to some embodiments. The correlation viewer is described in more detail in a later section with reference to FIG. 4.

For purposes of illustrating a simple example, FIG. 1 shows only three instances of processes and three log files. However, embodiments are not limited to this example, and a practical system may have two or more instances of processes and log files.

Figure 2:
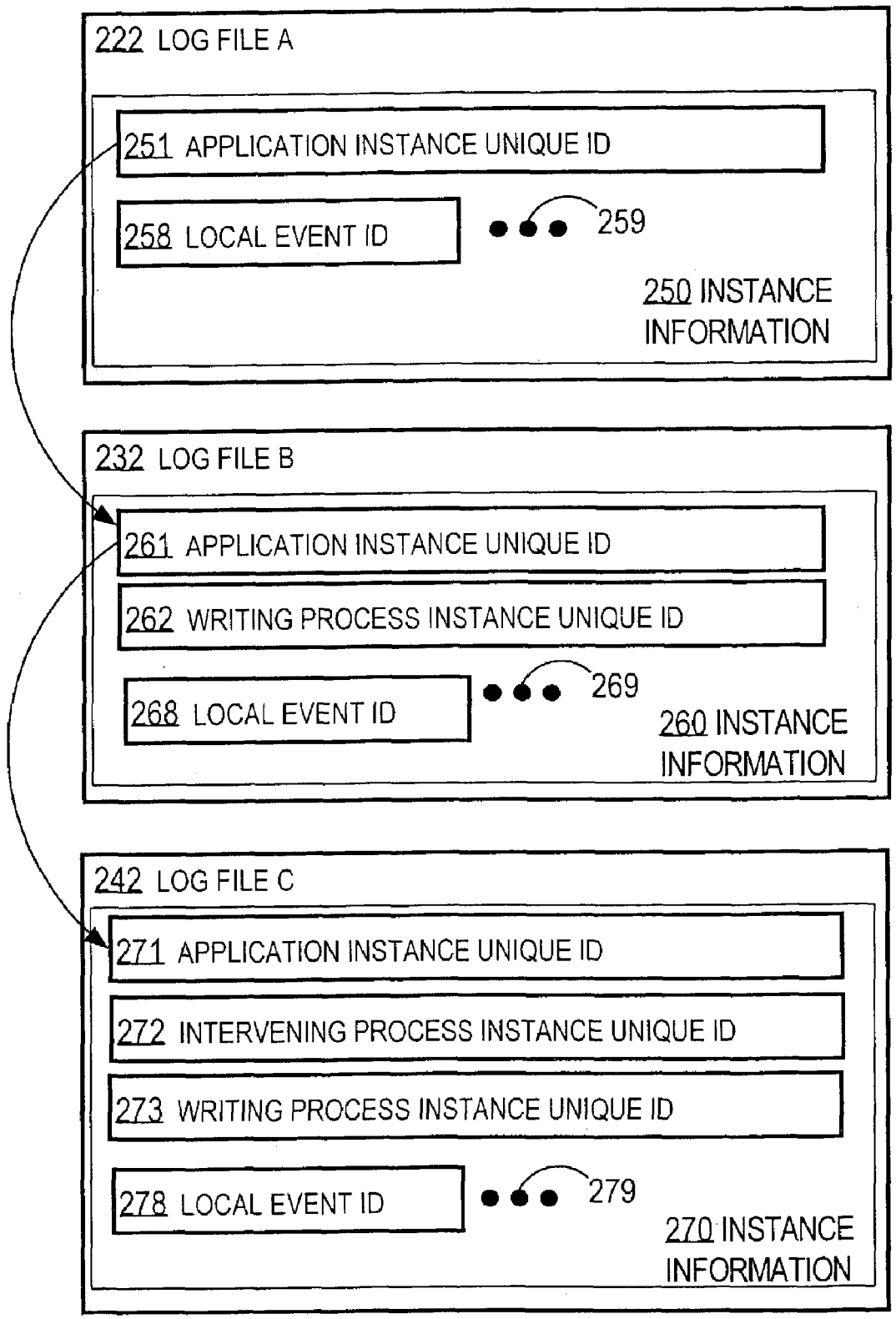
FIG. 2 is a block diagram that illustrates contents of several log files written by distributed processes that implement a single application, according to an embodiment

FIG. 2 is a block diagram that illustrates instance information 250, 260, 270 stored in multiple log files 222, 232, 242, respectively, according to one embodiment of log files 122, 132, 142 of FIG. 1. Information related to other instances of Process A, Process B, or Process C also can be included in log file A, log file B, and log file C.

As in conventional log files, the instance information 250, 260, 270 includes an event identification field established for the individual process ("local event ID") fields 258, 268, 278, for each event recorded by each instance. Ellipses 259, 269, 279 represent zero or more other local event fields for events recorded in information 250, 260, 270. For example, the local event ID field 258 for an invocation of Process B by an instance of process 120 (Process A) contains a code indicating an invocation and a reference to Process B, designated hereinafter by the symbol "CallB." Similarly, the local event ID field 268 for an invocation of Process C by an instance of process 130 (Process B) contains a code indicating an invocation and a reference to Process C, designated hereinafter by the symbol "CallC." For purposes of illustration, it is assumed that the local event ID field 278 for an error encountered by Process C contains a code indicating an error type, designated hereinafter by the symbol "ErrorX."

According to the illustrated embodiments, the instance information 250, 260, 270 in each log file includes field 251, 261, 271, respectively, for a unique identification for the instance of the application for which all the processes were invoked (hereinafter, "application instance unique ID" or "AIUI"). A value for the AIUI is unique for each instance of the applications among all instances of the application. Instance information associated with the same instance of the application is given the same value of the AIUI in the log file of every process involved in the application. For example, if the values are identical in AIUI fields 251, 261, 271, then the instance information 250, 260, 270 is all associated with the same instance of the application. For purposes of illustration, each instance of the application is assumed to correspond to a separate instance of Process A.

Various methods for generating a unique ID for each instance of an application may be used. An embodiment for generating a unique ID is described in more detail below with reference to FIG. 4.

In some embodiments, one or more of the instance information portions of the log files includes a field for a unique identification of the instance of a process writing to the log file. For example, instance information 260 for Process B includes writing process instance unique ID field 262 in log file 232 of Process B. Similarly, instance information 270 for Process C includes writing process instance unique ID field 273 in log file 242 of Process C.

In some embodiments, the instance information includes a field for the unique identification of instances of intervening processes between the instance of the application and the instance of the process writing the log file. For example, instance information 270 for Process C includes intervening process instance unique ID field 272.

2.2 Functional Overview

Using the instance unique IDs in the instance information written to each log file, data in multiple log files can be correlated. For example, instance information 250, 260, 270 are correlated based on sharing the same value in AIUI fields 251, 261, 271. In some embodiments, instance information 260, 270 also are correlated based on sharing the same value in process instance unique ID fields 262, 273.

In order to have the same value in the AIUI fields 251, 261, 271, the value of the AIUI passes from Process A, which generates the value and writes log file 222, to Process B which writes log file 232, to Process C, which writes log file 242. Such passing of the value is indicated in FIG. 2 by a curved arrow that connects field 251 to field 261 and a curved arrow that connects field 261 to field 271. The passing of the value is described in more detail below with reference to FIG. 3.

Similarly, in order to have the same value in the intervening process instance unique ID field 272 and the writing process instance unique ID field 262 indicating an instance of Process B, the value of the instance unique ID for Process B passes from Process B, which generates it and writes it to field 262, to Process C, which writes it to field 272.

3.0 Method of Correlating Data in Log Files

An illustrated embodiment of a method for correlating data in multiple log files is described below with reference to FIG. 3 and FIG. 4. Although steps are depicted in a particular order, in other embodiments the steps can be performed in a different order or overlapping in time.

3.1 Process of Writing Log Files

Figure 3:
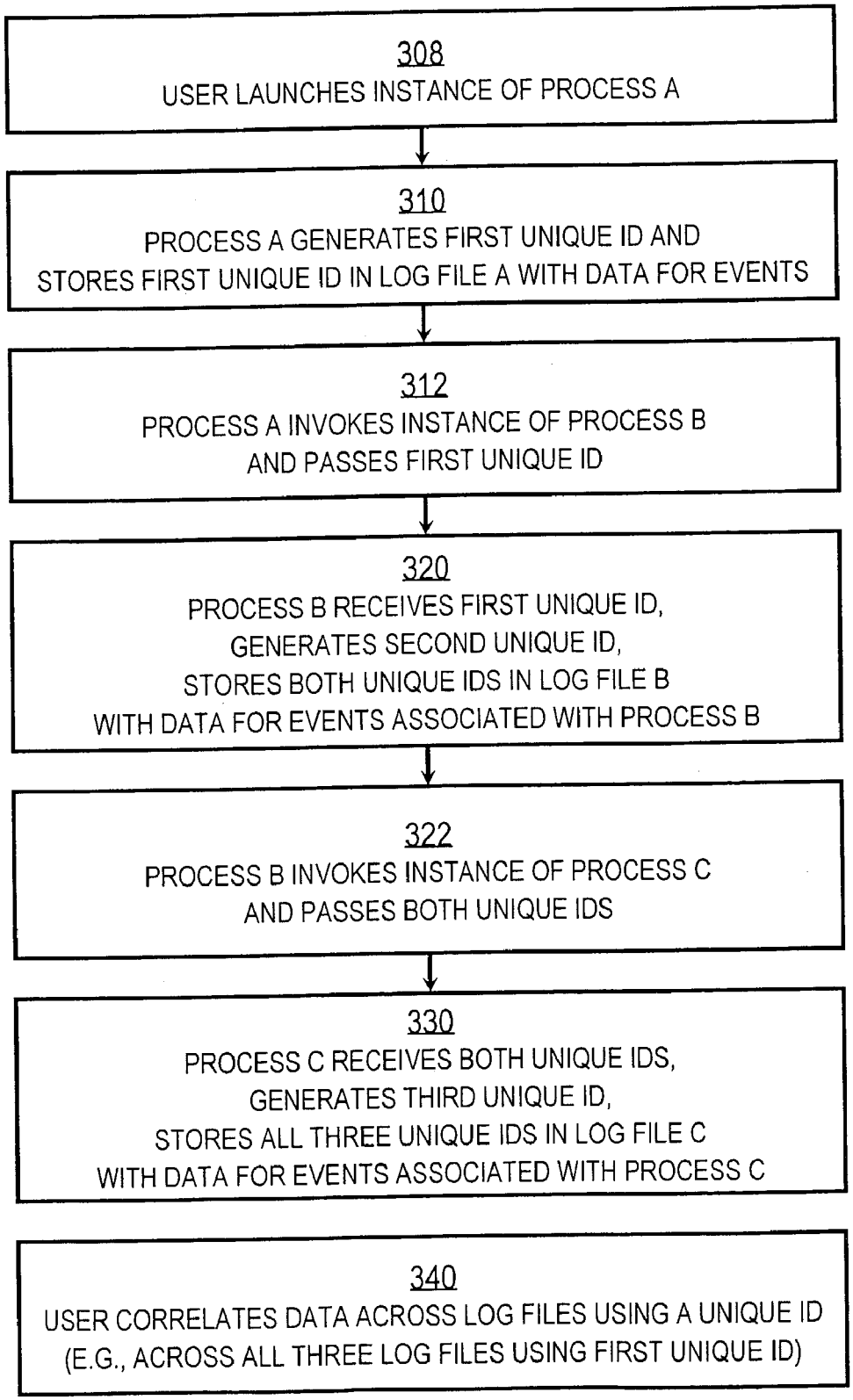
FIG. 3 is a flow diagram that illustrates a high level overview of one embodiment of a method for correlating output of multiple distributed processes that implement a single application.

FIG. 3 is a flow diagram that illustrates a high level overview of one embodiment 300 of a method for correlating output of multiple distributed processes that implement a single application. For purposes of illustrating a simple example, FIG. 3 addresses operations performed by only three processes and three log files. However, embodiments are not limited to this example, and a practical system involves operations performed by two or more processes and log files.

In step 308 the user launches an instance of Process A. For purposes of illustration, it is assumed that Process A manages multiple devices on a network, but in other embodiments Process A may perform any desired function.

In step 310, Process A generates a first unique ID for the application and stores the first unique ID in the AIUI field of its log file along with data for events associated with this instance of Process A in the instance information for Process A. For example, process 120 writes instance information 250 that includes the AIUI in field 251, one or more local event IDs in field 258, and information related to those local events.

Any method can be used to generate a unique ID for the instance of the application. In some embodiments a timestamp is used to generate the application instance unique ID. For example, a unique ID for an instance of the application that manages network devices may include a name of the application (e.g., "NMS"), a host name (e.g., a media access control, "MAC," number), a user identification ("user ID"), a date, hour, minute, second when the instance of the application is started. In some embodiments a timestamp is not used. For example, in an embodiment involving an automatic teller machine (ATM) transaction, the unique ID may be composed from concatenating the values of an operation type (e.g., "withdrawal"), an operation site (e.g., "FirstBankATM789"), an account owner (e.g., "JohnDoe"), an account number (e.g., "555555555"), a current amount in the account (e.g., "123.45"), and an amount withdrawn (e.g., "23.04"). Alternatively, a random number generator is used or a hash function is used to generate the unique ID.

The granularity of the unique ID can be selected based on the kinds of data to be correlated. For example, if there is no desire to correlate all operations performed by a user with the NMS, but only a desire to correlate operations related to using the application to perform a particular operation, then the unique ID may include data indicating the operation. For example, to correlate log files written as a result of configuration operations, data indicating configuration may be added to the unique ID. In this case, the "one application" associated with the distributed processes are the configuration operations of the network management program.

Correlations can also be performed on several levels of granularity simultaneously, by generating a unique ID for each level of granularity. For purposes of illustration, it is assumed that correlations are desirable at the levels of the Process A, Process B and Process C. Assume also that the value of the Process A AIUI is for a network management system (NMS) started by user with UserID 9999 on Jan. 23, 2002 at 10 seconds after 2:13 PM on a host with MAC number 7654321; and, is given by:

AIUI-A="NMS7654321999920020123141310"

In this example, process 120 writes into log file 222 instance information 250 that includes the value "NMS7654321999920020123141310" in field 251, one or more local event IDs, including "CallB" in field 258, and information related to those local events, such as the values of data sent to Process B while invoking Process B.

In step 312, Process A invokes Process B. The invocation can be performed in any manner known when an embodiment is implemented. For example, the invocation can take the form of a procedure call that causes Process B to be launched from a module of instructions with parameters values sent according to an application programming interface (API), or a remote procedure call that causes Process B to be launched from a module of instructions on a separate host according to the remote procedure API. In other embodiments, invocation involves sending a message to a process that is already running, such as a server process. For purposes of illustration, assume that Process B is a network management server that is already executing on a particular network device and manages the particular network device. Process A sends the value of AIUI to Process B. For example, process 120 sends AIUI-A to process 130.

In step 320, Process B receives the first AIUI of Process A and stores the first AIUI in the AIUI field of its log file in the instance information for Process B, along with data for events associated with the instance of Process B executed in response to the invocation by the current instance of Process A. For example, process 130 writes into log file 232 instance information 260 that includes the value "NMS7654321999920020123141310" in field 261, one or more local event IDs, including "CallC" in field 268, and information related to those local events, such as the values of data sent from Process A, and the values of data sent to Process C while invoking Process C.

In the illustrated embodiment, correlations at the granularity of Process B are also desired. Therefore Process B is configured to generate a unique ID for this instance of Process B. In essence, Process B is the application at this second level of granularity. The unique ID for this instance of Process B is called hereinafter "AIUI-B." For purposes of illustration, it is assumed that the value of the AIUI-B is for a network device management server (NDMS) started for user with UserID 9999 on Jan. 23, 2002 at 55 seconds after 2:22 PM on a network device with MAC number 1098765 is given by:

AIUI-B="NDMS1098765999920020123142255"

In this example, process 130 also includes in instance information 260 written into log file 232 the value "NDMS1098765999920020123142255" in field 262. Field 262 holds the unique ID for the instance of the process writing the log file; field 262 is called the "writing process instance unique ID field." Though shown as two separate fields 261, 262 in FIG. 2, in other embodiments the two unique IDs may be combined into one field ("correlation field"). In some embodiments, the two unique IDs are separated in the correlation field by a delimiter character, such as "/", which is not used in generating any unique ID.

In other embodiments, correlations at the granularity of Process B are not desired and Process B does not generate a value AIUI-B, and writing process instance unique ID field 262 is omitted from instance information 260.

In step 322, Process B invokes Process C. The invocation can be performed in any manner known when the embodiment is implemented. For purposes of illustration, it is assumed that Process C is an authentication agent program that prompts a user to enter a password. Process B sends the value of the AIUI to Process C. For example, process 130 sends AIUI-A to process 140 as a parameter of a procedure call or as a portion of a message.

In the illustrated embodiment, correlations at the granularity of Process B are desired. Therefore, Process B also sends the value of the unique ID for this instance of Process B to Process C. For example, process 130 sends the value AIUI-B to process 140 along with the value of AIUI-A. In some embodiments, the values of AIUI-A and AIUI-B are sent as separate parameters or portions of a message; alternatively, the values of AIUI-A and AIUI-B are sent in a combined parameter or portion of a message.

In step 330, Process C receives the first AIUI of Process A and stores the first AIUI in the AIUI field of its log file in the instance information for Process C, along with data for events associated with this instance of Process C executed in response to the invocation by Process B. For example, process 140 writes into log file 242 instance information 270 that includes the value "NMS7654321999920020123141310" in field 271, one or more local event IDs, and related information, such as data sent from Process B.

In the illustrated embodiment, correlations at the granularity of Process B are also desired; therefore Process C also receives the second AIUI of Process B and stores the second AIUI in field 272 for intervening process instance unique IDs in instance information 270. For example, process 140 includes in instance information 270 in log file 242 the value "NDMS1098765999920020123142255" in field 272.

In the illustrated embodiment, correlations at the granularity of Process C are also desired. Therefore Process C is configured to generate a unique ID for this instance of Process C. In essence, Process C is the application at this third level of granularity. The unique ID for this instance of Process C is called "AIUI-C." For purposes of illustration, it is assumed that the processor executing process C is unsynchronized with the processor executing Process B, and therefore that Process C appears to start before it is called by Process B. It is further assumed that the value of the AIUI-C is for a network authentication server (NAS) started for user with UserID 9999 on Jan. 23, 2002 (apparently) at 51 seconds after 2:22 PM on a network device with MAC number 4567890 is given by: AIUI-C="NAS4567890999920020123142251" In this example, process 140 also includes in the instance information 270 written into log file 242 the value "NAS4567890999920020123142251" in writing process instance unique ID field 273. Though shown as three separate fields 271, 272, 273 in FIG. 2, two or more of the three unique IDs may be combined into one correlation field.

In other embodiments, correlations at the granularity of Process B or Process C or both are not desired and Process B or Process C does not generate a value AIUI-B or AIUI-C, respectively, and intervening process instance unique ID field 272 or writing process instance unique ID field 273 or both are omitted from instance information 270.

During step 330, Process C encounters an event. In the illustrated example, Process C encounters an error event associated with authentication failure. For example, a user has failed to enter a proper password within a certain amount of time or number of tries. Assume that such a failure is designated by error number X101 according to the developers of Process C. Process C records local event ID for the event along with other data for the event in instance information 270 in log file 242. For example, Process C stores the error number "X101" in the local event ID field 278. Assume that the other information associated with the event that is stored in the instance information 270 includes data indicating the number of attempts made, the passwords used, and the amount of time waited after each prompt for a response from the user. For example, it is assumed that the user made two attempts with two different passwords but did not respond to a third prompt in a maximum time allotted for a response, such as two minutes; and, it is assumed that this information is stored in the instance information 270 outside the local event ID field 278.

In step 340 a user correlates data across log files using the values in the correlation fields, including AIUI fields 251, 261, 271, the writing process instance unique ID fields 262, 273, and the intervening process instance unique ID field 272. An embodiment of step 330 is described below with reference to FIG. 4. Step 340 may be performed even though Process C does not return information to Process B. In other embodiments in which Process C does return information to Process B, step 240 may be performed before Process C returns information to Process B and before Process B returns information to Process A.

Although AIUI fields 251, 261, 271 are distinguished from fields 262, 272, 273 in FIG. 2 and the above discussion for purposes of a concrete example, in practice any of the fields can be considered an AIUI field. Which field represents the application, and which field represents a super-application process or a sub-application process, such as a writing process or intervening process, is purely a matter of the granularity of the correlation that is sought. When the correlation is sought at the granularity of Process B, Process B can be considered the application and fields 262 and 272 can be considered the AIUI fields. In this case, fields 251, 261, 271 represent unique IDs for instances of a super-application process; field 273 represents a unique ID for an instance of a sub-application process.

3.2 Process of Viewing Data in Log Files

Figure 4:
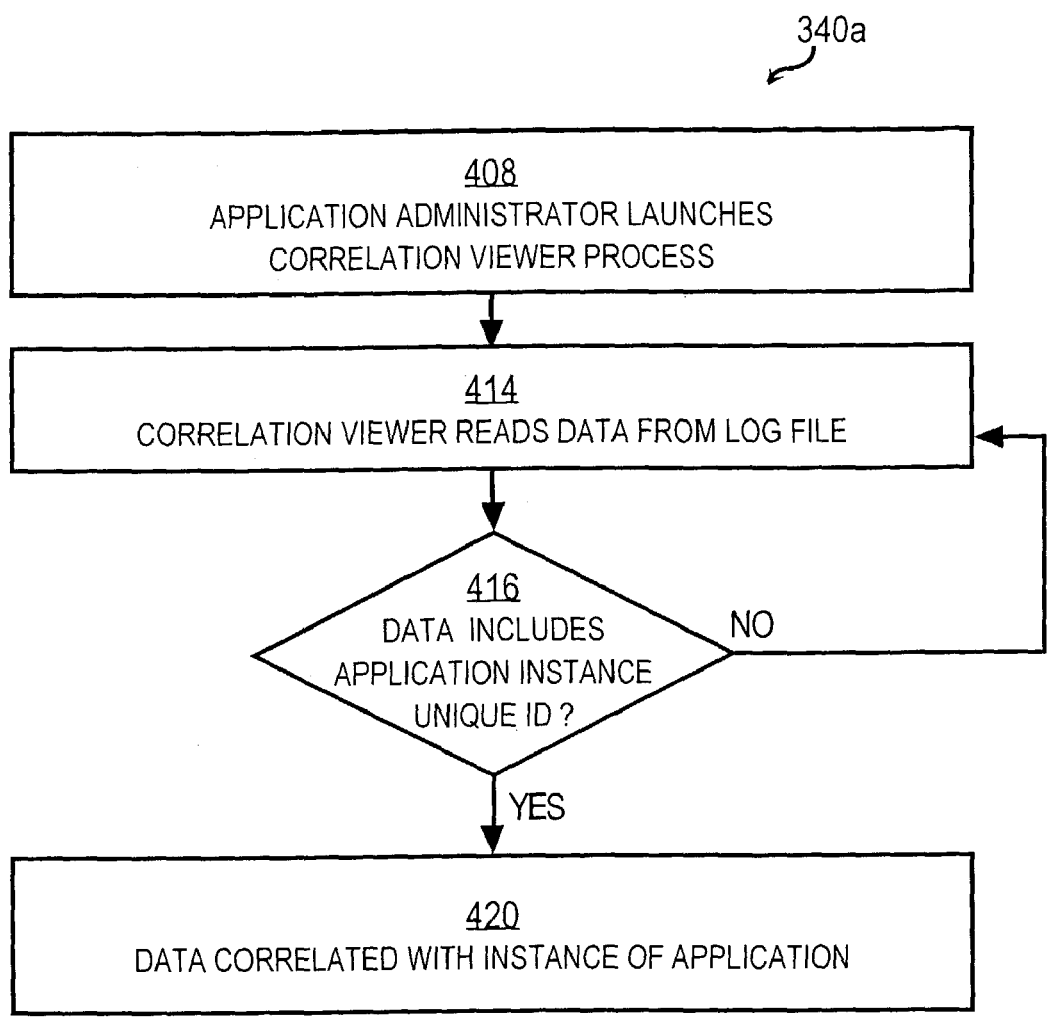
FIG. 4 is a flow diagram that illustrates a high level overview of one embodiment of a method for viewing correlated output of multiple distributed processes that implement a single application.

FIG. 4 is a flow diagram that illustrates a high level overview of one embodiment 340*a* of step 340 in FIG. 3 for viewing correlated output of multiple distributed processes that implement a single application. It is assumed for purposes of illustration that, before steps of embodiment 340*a* are initiated, other actions were taken by the network management program, Process A, and by the network management server, Process B, and by the authentication agent program, Process C that has led to other events occurring and data describing the other events to be entered into each log file corresponding to the three processes, both before and after the data described in the preceding section.

With a conventional system, when a user tries to determine what led to a fault during Process A, the user examines a large amount of data in log files 222, 232, 242 and determine which entries are associated with events of Process A, as described in the Background section. It may be impossible to determine which event information in log file 242 is associated with an event in log file 222. For example, based on timestamps of unsynchronized processors, it may be difficult to correlate data in instance information 260 with data in instance information 270, because from the unsynchronized timestamps the instance information 270 appears associated with an instance of Process C that started before the instance of Process C invoked by the instance of Process B described in the instance information 260.

According to the illustrated embodiment, the user only need determine the AIUI value from the log file for Process A, and then find that same value in any of the other log files to find additional information correlated with the same instance of the application. For example, the correlation viewer determines from log file 222 that the failed instance of Process A has the AIUI value "NMS76543219999200201 23141310," and then finds that same value in any of the other log files, e.g., in field 271 of log file 242, to find additional information correlated with the same instance of the application.

In step 408, a user launches a correlation viewer process 180. In other embodiments, the viewer process 180 is already executing on one or more of the hosts 110, and the user merely sends a message indicating a desire to view data associated with an instance of an application. Step 408 includes indicating the instance of a process with which the data to be viewed is correlated. For example, the user indicates that data correlated with the instance of network management program, "NMS76543219999200201 23141310," are of interest.

In step 414, the correlation viewer reads data from any log file. For example, the event viewer reads data for Process C from the Log file 242.

In step 416, the correlation viewer determines whether the data includes an AIUI value that matches the instance of interest. For example, the correlation viewer 180 determines whether AIUI field 271 of log file 242 has NMS76543219999200201 23141310 for the instance of interest. If not, control passes back to step 414 to read data from another log file. If so, control passes to step 420.

In step 420, the correlation viewer presents some or all of the information from the log file to the user. For example, the correlation viewer 180 displays a list of events in instance information 270 of log file 242 that are correlated with the instance of Process A described in instance information 250.

Similarly, correlation viewer 180 displays a list of events in instance information 270 of log file 242 that are correlated with the instance of Process B described in instance information 260. The instance information 270 is determined to be correlated with the instance information 260 without determining a time difference between a first timestamp associated with the instance information 270 and a second timestamp associated with the instance information 260. Such a difference would be negative, and would present a problem for determining whether information for an instance of Process B is correlated with information from an instance of Process C that started before Process B invoked Process C.

In the illustrated embodiments, correlated data is found in output of several distributed processes that implement a single application.

4.0 Implementation Mechanisms—Hardware Overview

Figure 5:
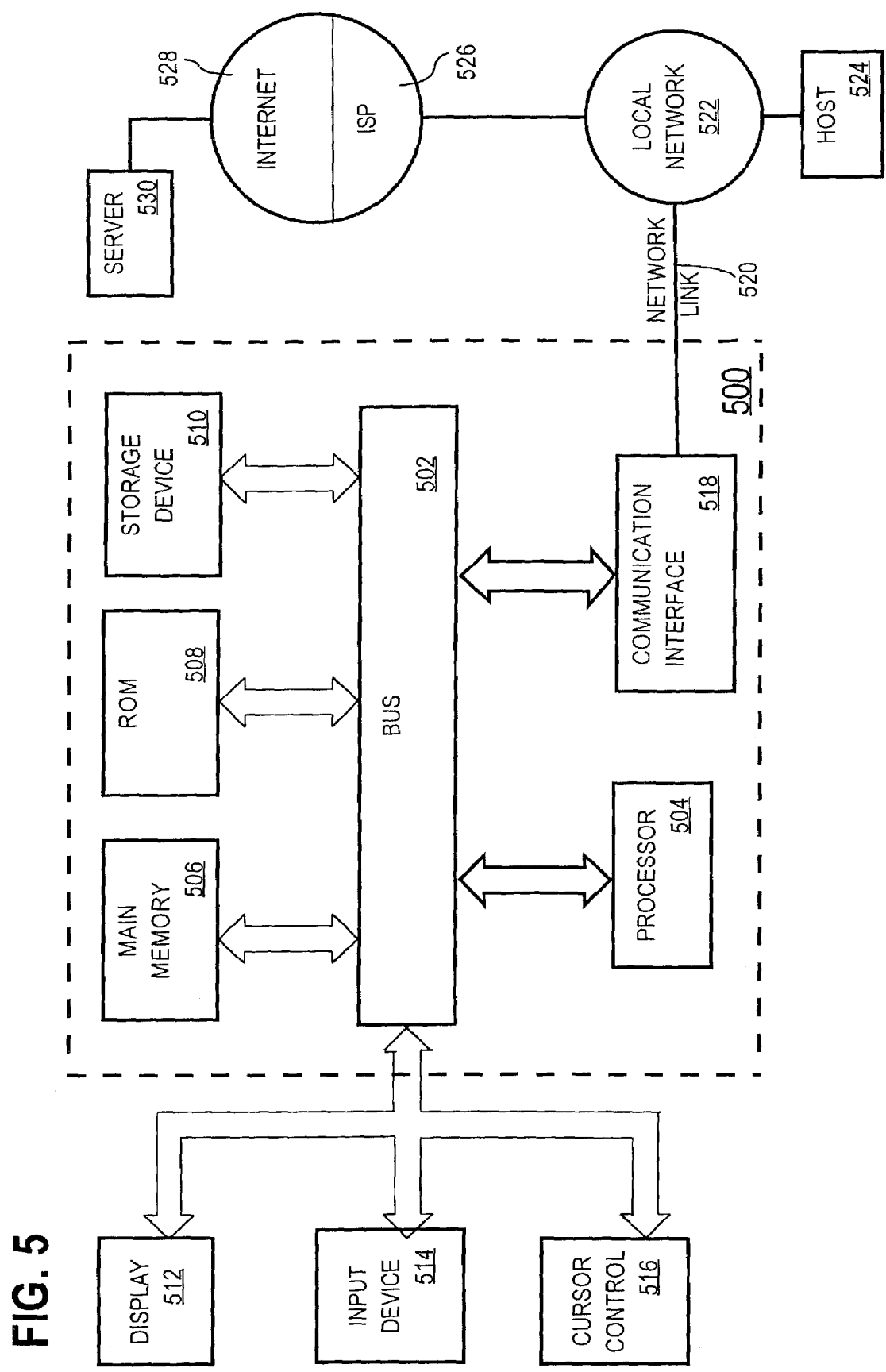
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for correlating output of several distributed processes that implement an application. According to one embodiment of the invention, correlation of output of several distributed processes is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for correlating output of distributed processes as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of correlating output of distributed processes related to a computer application, the method comprising the computer-implemented steps of:

receiving, at an output viewing process output from a first event log file, written by a first process of a plurality of distributed processes that perform one computer application, wherein the first event log file contains first event data including at least one of:

a first unique identifier for a first instance of the computer application, wherein the first unique identifier is different from any other identifier for any other instance of the computer application; and a set comprising the first unique identifier and a third unique identifier received from a third process of a plurality of distributed processes, different from the first process;

receiving, at the output viewing process output from a second event log file written by a second process of the plurality of distributed processes, wherein the second event log file contains second event data including a second unique identifier for a second instance of the computer application, wherein the second unique identifier is different from any other identifier for any other instance of the computer application;

determining, whether the first event data is correlated with the second event data based on whether the second unique identifier is the same as at least one of the first unique identifier and the third identifier; and presenting at least a portion of the output from the first event log file and the second event log file in response to determining whether the first event data is correlated with the second event data and based on whether the first unique identifier is the same as the second unique identifier wherein each instance of the computer application is associated with no more than one unique identifier.

2. A method as recited in claim 1, wherein the third process is different from the second process.

3. A method as recited in claim 1, wherein the third process is the same as the second process.

4. The method as recited in claim 1, wherein the third unique identifier is appended to the first unique identifier.

5. The method as recited in claim 1, further comprising including the first unique identifier in third event data passed to invoke the third process by the first process.

6. The method as recited in claim 5, wherein the third process is the same as the first process.

7. The method as recited in claim 5, wherein the third process is different from the first process.

8. The method as recited in claim 5, wherein the third process is the same as the second process.

9. The method as recited in claim 5, wherein the third process is different from the second process.

10. The method as recited in claim 1, wherein the first unique identifier is included in the first event data written by the first process to indicate a fault detected by the first process.

11. The method as recited in claim 1, wherein said step of determining whether the first event data is correlated with the second event data does not include determining a time difference between a first timestamp associated with the first data and a second timestamp associated with the second data.

12. The method as recited in claim 1, wherein the first event data is logged by one instance of the first process, and includes data that describes a fault detected by the first process.

13. A computer-readable tangible storage medium carrying one or more sequences of instructions for correlating output of distributed processes related to a computer application, which instructions, when executed by one or more processors, cause the one or more processors to carry out the steps of:

receiving, at an output viewing process output from a first event log file, written by a first process of a plurality of distributed processes that perform one computer application, wherein the first event log file contains first event data including at least one of:

a first unique identifier for a first instance of the computer application, wherein the first unique identifier is different from any other identifier for any other instance of the computer application; and a set comprising the first unique identifier and a third unique identifier received from a third process of a plurality of distributed processes, different from the first process;

receiving, at the output viewing process output from a second event log file written by a second process of the plurality of distributed processes, wherein the second event log file contains second event data including a second unique identifier for a second instance of the computer application, wherein the second unique identifier is different from any other identifier for any other instance of the computer application;

determining, whether the first event data is correlated with the second event data based on whether the second unique identifier is the same as at least one of the first unique identifier and the third identifier; and presenting at least a portion of the output from the first event log file and the second event log file in response to determining whether the first event data is correlated with the second event data and based on whether the first unique identifier is the same as the second unique identifier wherein each instance of the computer application is associated with no more than one unique identifier.

14. The computer-readable tangible storage medium as recited in claim 13, wherein the instructions further comprise instructions for carrying out the step of including the first unique identifier in third event data passed to invoke the third process by the first process.

15. A computer-readable tangible storage medium as recited in claim 13, wherein the first unique identifier is included in the first event data written by the first process to indicate a fault detected by the first process.

16. An apparatus for correlating output of distributed processes related to a computer application, having one or more processors comprising:

means for receiving, at an output viewing process output from a first event log file, written by a first process of a plurality of distributed processes that perform one computer application, wherein the first event log file contains first event data including at least one of:

a first unique identifier for a first instance of the computer application, wherein the first unique identifier is different from any other identifier for any other instance of the computer application; and a set comprising the first unique identifier and a third unique identifier received from a third process of a plurality of distributed processes, different from the first process;

means for receiving, at the output viewing process output from a second event log file written by a second process of the plurality of distributed processes, wherein the second event log file contains second event data including a second unique identifier for a second instance of the computer application, wherein the second unique identifier is different from any other identifier for any other instance of the computer application;

means for determining, whether the first event data is correlated with the second event data based on whether the second unique identifier is the same as at least one of the first unique identifier and the third identifier; and means for presenting at least a portion of the output from the first event log file and the second event log file in response to determining whether the first event data is correlated with the second event data and based on whether the first unique identifier is the same as the second unique identifier, wherein each instance of the computer application is associated with no more than one unique identifier.

17. The apparatus of claim 16, further comprising means for including the first unique identifier in third event data passed to invoke a third process by the first process.

18. The apparatus of claim 16, wherein the first unique identifier is included in the first event data written by the first process to indicate a fault detected by the first process.

19. An apparatus for creating and storing troubleshooting information for diagnosing one or more problems experienced in one or more completed voice calls that are carried by a packet-switched data network, comprising:
   a network interface that is coupled to the data network for receiving one or more packet flows therefrom;
   a processor;
   one or more stored sequences of instructions which, when executed by the processor, cause the processor to carry out:
   receiving, at an output viewing process output from a first event log file, written by a first process of a plurality of distributed processes that perform one computer application, wherein the first event log file contains first event data including at least one of:
      a first unique identifier for a first instance of the computer application, wherein the first unique identifier is different from any other identifier for any other instance of the computer application; and
      a set comprising the first unique identifier and a third unique identifier received from a third process of a plurality of distributed processes, different from the first process;
   receiving, at the output viewing process output from a second event log file written by a second process of the plurality of distributed processes, wherein the second event log file contains second event data including a second unique identifier for a second instance of the computer application, wherein the second unique identifier is different from any other identifier for any other instance of the computer application;
   determining, whether the first event data is correlated with the second event data based on whether the second unique identifier is the same as at least one of the first unique identifier and the third identifier; and
   presenting at least a portion of the output from the first event log file and the second event log file in response to determining whether the first event data is correlated with the second event data and based on whether the first unique identifier is the same as the second unique identifier,
   wherein each instance of the computer application is associated with no more than one unique identifier.

20. The apparatus of claim 19, further comprising instructions which when executed cause performing including the first unique identifier in third event data passed to invoke the third process by the first process.

21. The apparatus of claim 19, wherein the first unique identifier is included in the first event data written by the first process to indicate a fault detected by the first process.

* * * * *